Patented July 28, 1942

2,290,922

UNITED STATES PATENT OFFICE 2,290,922

PREPARATION OF TITANIUM OXIDE

Fredric C. Verduin, Audubon, N. J., assignor to The Sherwin-Williams Company, Cleveland, Ohio, a corporation of Ohio No Drawing. Application April 6, 1940, Serial No. 328,375

7 Claims. (Cl. 23—202)

The present invention relates to titanium dioxide pigments and has special reference to pigments prepared from aqueous solutions of simple or complex titanium fluoride compounds. Such solutions are obtained by the action of fluorine, hydrofluoric acid, or a reactive fluoride, such as ammonium fluoride, on ilmenite, rutile, or other titaniferous material.

This application is a continuation in part of application Serial No. 236,067, filed October 20, 1938, on which Patent No. 2,232,817 was issued February 25, 1941.

The fluoride solutions of titanium differ from the corresponding sulphate and chloride solutions in possessing a relatively greater stability as exhibited by their greatly reduced tendency to hydrolyze under thermal treatment or dilution. Two examples which show this stability are given so that those familiar with titanium chemistry will recognize this unusual property. If 1 cc. of an ilmenite sulphate solution containing 8% $TiO_2$, 16% $H_2SO_4$, 14% $FeSO_4$ be diluted to 1000 cc. with distilled water, rapid hydrolysis occurs and on standing a white flocculated precipitate forms from the milky liquid. If 1 cc. of a complex titanium-ammonium-fluoride solution of the composition 8% $TiO_2$, 11% $NH_3$, and 20% F be diluted to 1000 cc. with distilled water no precipitate will be observed.

As a second example, if these two solutions are refluxed, the sulphate solution will begin to develop a hydrolysis of titania within an hour, proceeding substantially to completion in four hours, whereas the fluoride solution will show no hydrolysis even after a considerably longer period of time.

In order to obtain hydrates from one of the types of fluoride solutions mentioned above, it is necessary to maintain a pH higher than 7.0 by the use of an alkali. In general the hydrolyzing agent used is aqueous ammonia, the use of the alkali metal hydroxides being complicated by the adsorption of alkali metal ions on the hydrate or by the formation of insoluble complexes.

By obtaining complex fluoride solutions containing substantially only fluorine, titanium, and ammonium complexes, and with all the impurities reduced to a minimum by known methods, and by using pure ammonium hydroxide to effect precipitation, titania has been produced consistently by me in a coagulated filterable form. Such precipitates have been washed and calcined to a pigment which can be compared favorably with current titanium pigments offered for sale. The tinting strength and hiding power of these pigments is greater than the average product, due to quantities of rutile which are formed in the pigment during calcination.

This invention relates to the discovery that by the use of certain agents hereinafter termed "flocculents" and which may be added either to the titanium solution or to the ammonia, the titania hydrate precipitate is non-peptized and is caused to coagulate or flocculate even more intensely with the result that it is easily filterable and the efficiency of washing greatly improved; thus a purer product is obtained by the use of my novel flocculent, which product will withstand calcination at a higher temperature than has been possible heretofore without deterioration of color. This higher temperature favors the formation of rutile and the accompanying superior pigment properties. Those familiar with the art will recognize that many impurities, even in small amounts, greatly reduce the maximum temperature permissible during calcination.

These flocculents have been found to include all dibasic and polybasic acids and their salts, provided such acids or salts will yield either a dibasic or polybasic acid radical or a divalent or polyvalent ion in the ammonia or titanium solution. Special preference is given to the free acids such as sulphuric acid, phosphoric acid, oxalic, citric, arsenic, and tartaric, and to the ammonium salts thereof and to ammonium carbonate, but naturally I am not limited to these alone. I realize that using alkali metal salts may cause the precipitation of simple or complex alkali metal fluorides which are not easily soluble and remain in the subsequently precipitated titania, and affect the final product. I also realize the use of many metallic salts will yield insoluble fluorides which will color the final titania when calcined with it. However, all such salts do possess flocculating properties. I have further discovered that while chlorides of monovalent metals and hydrochloric acid tend to deflocculate the precipitated titania, the chlorides of divalent or polyvalent elements which will dissolve in the titania liquor will also act as flocculents. Aluminum and zinc chlorides are examples of this type.

While the preferred method of adding the flocculator is either to the tiania solution, or to the ammonia, I do not wish to be limited to this particular method. For example, I may add the flocculator to the mixture after the precipitation of the titania, or the flocculator may be added to the ore, or at any place thereafter up to the time of filtering the hydrated titania.

Only a relatively small amount of the flocculator is required and, generally, the amount is about 1% or less, based on the weight of TiO₂ present in the titania solution, as will be noted from the following illustrative examples of the use of certain flocculators which are more or less typical of the group above specified.

Example I

To 10 kilograms of a complex titanium-ammonium-fluoride solution, prepared by digesting ilmenite with an excess of ammonium fluoride according to the method disclosed by Svendsen, U. S. 2,042,435, and suitably purified, and containing 800 grams of TiO₂ add 4 grams of sodium sulphate. This mixture is run into 50 kilograms of 10% ammonium hydroxide solution over a period of 40 minutes. The highly flocculated hydrated titania is then washed free from adhering impurities and calcined for two hours at 1000° C. The product is very white pigmentary rutile.

Example II

To 1000 pounds of titanium-ammonium-fluoride solution containing 80 pounds of titanium dioxide is added 0.298 pound of ammonium phosphate. This solution is then slowly added to 5000 pounds of 15% aqueous ammonium hydroxide at approximately 40° C. The slurry is thoroughly agitated and filtered. The filter cake is then washed free of soluble impurities, dried, and calcined for four hours at 1000° C. This pigment possesses very superior pigment qualities with respect to tinting strength and hiding power.

Example III

To 10,000 pounds of 5% ammonia add 0.4 pound oxalic acid crystals. During one hour add 1000 pounds of titanium-ammonium-fluoride solution, containing 65 pounds of titanium dioxide. with constant stirring.

The precipitated hydrate is then filtered, washed, and calcined at from 800° C. to 1000° C. until the pigmentary rutile is formed.

Example IV

One kilogram of ilmenite containing 53% of TiO₂ is heated with 6 kilograms of a 50% solution of ammonium fluoride until the mass has become heavy and pasty. The mass is diluted to 6% TiO₂ concentration and settled, and the titanium-ammonium-fluoride solution removed by decantation and the excess acidity neutralized with ammonia. To the solution at 50° C. is added ammonium sulphide to the extent of 0.12 kilo of 40% ammonium sulphide per kilo of titanium dioxide in solution. The black liquor is filtered and then a further clarification is effected using 25 grams of trisodium phosphate dissolved in water per kilo of titanium dioxide in solution. The sodium ions immediately form titanium fluorine complexes which are sparingly soluble and crystallize out as an easily filterable material. During the formation and crystallization of these complexes residual amounts of impurities are also precipitated or occluded and removed from the solution. Instead of trisodium phosphate I may use sodium hydroxide or a disodium phosphate, or mono-sodium phosphate, or phosphoric acid and any combination of these salts.

The precipitated sodium salts are removed by filtration. The purified solution is now slowly added, during 40 minutes to twice its volume of 20% ammonia, with constant agitation. The hydrate very rapidly settles, due to the intense coagulating action of the phosphate ion, and may be filtered and washed free from fluorine and other undesirable soluble impurities. The hydrate is then dried and calcined at a high temperature (800 to 1000° C.) until the optimum pigment properties of rutile are obtained. These properties and their dependency on temperature of calcination are influenced greatly by the presence of phosphate ion.

Example V

To 8 kilograms of a complex titanium-ammonium-fluoride solution, prepared by digesting ilmenite with an excess of ammonium fluoride according to the method disclosed by Svendsen, U. S. 2,042,435, and suitably purified, and containing 800 grams of TiO₂ add 2.6 grams of 85% phosphoric acid. This mixture is run into 32 kilograms of 20% ammonium hydroxide solution over a period of 40 minutes. The highly flocculated hydrated titania is then washed free from adhering impurities and calcined for two hours at 1000° C. The product is very white pigmentary rutile.

While the above examples illustrate various ways of practicing my invention, it will be understood that the scope of the invention is not limited to the use of the particular flocculents or the methods described therein but includes all flocculents and methods as defined in the appended claims.

Having thus described my invention, I claim:

1. Process for the preparation of pure titanium dioxide having rutile crystalline structure which comprises hydrolytically precipitating non-peptized, easily filterable, hydrous titanium oxide from an aqueous solution of a titanium tetrafluoride compound to which has been added a small amount of a compound selected from the group consisting of the acids and alkali metal salts of the citrate, arsenate, and carbonate radicals, separating the said hydrous titanium oxide and calcining it to rutile crystalline structure.

2. Process for the preparation of pure titanium dioxide having rutile crystalline structure which comprises contacting an aqueous solution of a titanium tetrafluoride compound containing a small amount of a compound selected from the group consisting of the acids and alkali metal salts of the citrate, arsenate, and carbonate radicals with an aqueous solution of ammonia to hydrolytically precipitate non-peptized, easily filterable, hydrous titanium oxide, separating the said hydrous titanium oxide and calcining it to rutile crystalline structure.

3. Process for the preparation of pure titanium dioxide having rutile crystalline structure which comprises hydrolytically precipitating non-peptized, easily filterable, hydrous titanium oxide from an aqueous solution of a titanium tetrafluoride compound containing about 1% or less of a compound selected from the group consisting of the acids and alkali metal salts of the citrate, arsenate and carbonate radicals, based on weight of TiO₂ contained in the said solution, separating the said hydrous titanium oxide and calcining it to rutile crystalline structure.

4. Process for the preparation of pure titanium dioxide having rutile crystalline structure which comprises contacting an aqueous solution of a titanium tetrafluoride compound to which has been added about 1% based on the weight of TiO₂ of a compound selected from the group consisting of the acids and alkali metal salts of the citrate, arsenate, and carbonate radicals with an aqueous solution of ammonia to hydrolytically precipitate non-peptized, easily filterable, hydrous titanium oxide, separating the said hydrous titanium oxide and calcining it to rutile crystalline structure.

5. Process for the preparation of pure titanium dioxide having rutile crystalline structure which comprises hydrolytically precipitating non-peptized, easily filterable, hydrous titanium oxide from an aqueous solution of a complex titanium-ammonium-fluoride compound containing a small amount of a compound selected from the group consisting of the acids and alkali metal salts of the citrate, arsenate, and carbonate radicals, separating the said hydrous titanium oxide and calcining it to rutile crystalline structure.

6. Process for the preparation of pure titanium dioxide having rutile crystalline structure which comprises contacting an aqueous solution of a complex titanium-ammonium-fluoride compound to which has been added a small amount of a compound selected from the group consisting of the acids and alkali metal salts of the citrate, arsenate, and carbonate radicals with an aqueous solution of ammonia to hydrolytically precipitate non-peptized, easily filterable, hydrous titanium oxide, separating the said hydrous titanium oxide and calcining it to rutile crystalline structure.

7. Process for the preparation of pure titanium dioxide having rutile crystalline structure which comprises hydrolytically precipitating non-peptized, easily filterable, hydrous titanium oxide from an aqueous solution of a complex titanium-ammonium-fluoride containing about 1% or less of a compound selected from the group consisting of the acids and alkali metal salts of the citrate, arsenate, and carbonate radicals, based on weight of $TiO_2$ contained in the said solution separating the said hydrous titanium oxide and calcining it to rutile crystalline structure.

FREDRIC C. VERDUIN.